Patented Jan. 14, 1930

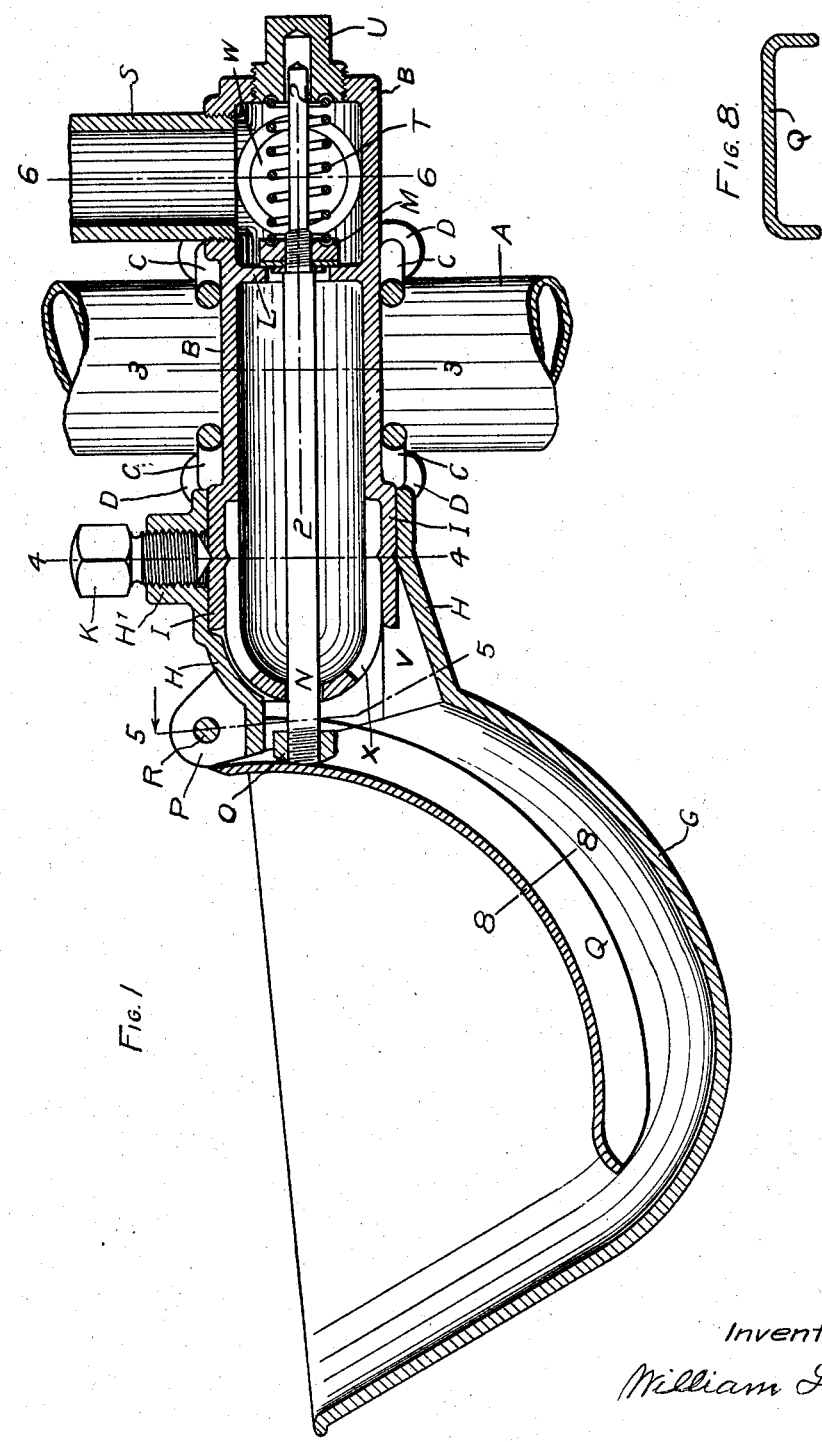

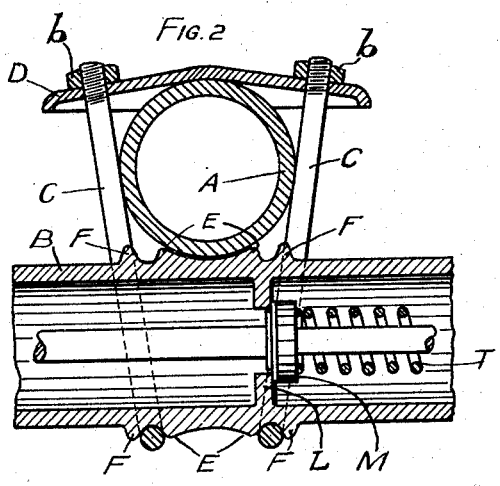
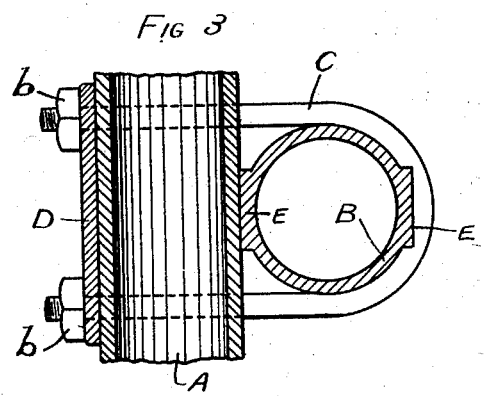
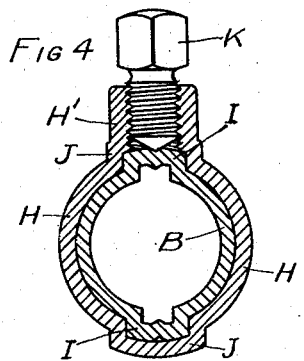
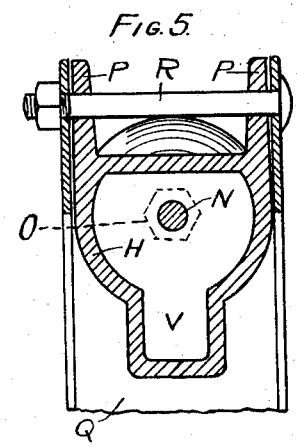
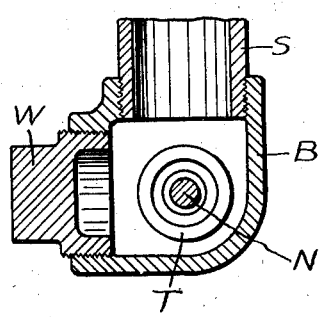
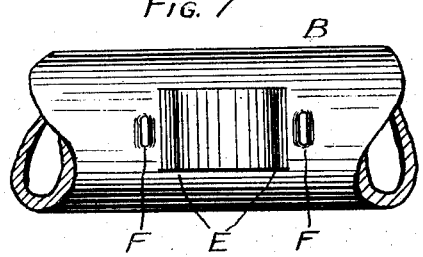

1,744,007

UNITED STATES PATENT OFFICE

WILLIAM LOUDEN, OF FAIRFIELD, IOWA, ASSIGNOR TO THE LOUDEN MACHINERY COMPANY, A CORPORATION OF IOWA

WATER BOWL FOR ANIMAL STALLS

Application filed September 20, 1926, Serial No. 136,646. Renewed June 23, 1928.

My invention relates to water bowls to be placed in animal stalls and to be operated by the animal confined therein, and it consists of an improvement in the means of attaching the bowls to the stall posts and in the means for operating the water supply mechanism. Also, of other improvements in the details of construction which will be hereafter described and more particularly set forth in the claims.

In the accompanying drawings forming a part of this specification. Fig. 1 is a vertically disposed longitudinal section of a water bowl and its connections embodying my invention, a side view of a portion of the stall post to which the bowl is connected, also being shown. Fig. 2 is a horizontal section on line 2—2 of a central portion of Fig. 1, the parts which are cut away in Fig. 1 being replaced to make the structure complete. Fig. 3 is a vertically disposed transverse section on line 3—3 of a central portion of Fig. 1. Figs. 4, 5 and 6 are vertically disposed transverse sections on lines 4—4, 5—5 and 6—6 of Fig. 1, looking in the direction of the arrow in Fig. 5. Fig. 7 is a detail view which will be hereafter explained. Fig. 8 is a transverse section on line 8—8 of Fig. 1. In Figs. 3, 4, 5, 6, and 8, as well as in Fig. 2, the parts cut away in Fig. 1 are replaced to make the structure complete.

Referring to the drawing, A represents a portion of a post for an animal stall and B is a tubular casting containing a valve through which the water is conducted into the bowl. This valve casting occupies, as shown, a horizontally disposed position, and is connected directly to the vertically disposed post A, preferably by a pair of U bolts C passed around it and then by the post and through a clip D on the opposite side of the post, as most plainly shown in Figs. 2 and 3. As will be seen by these figures, the casting B has projections E and F on opposite sides of its central portion, and between the projections E there is a concave portion on each side adapted to fit the contour of the stall post A.

It will also be seen by Figs. 3 and 7, the latter being a side view of a central portion of the casting B, that the projections E and the concave portion between them, are extended some distance laterally across the casting. The object of the lateral extension of these parts is to hold the casting in a rigid position on the stall post at substantially right angles thereto, and while permitting either side of the casting to be applied to the post by turning it over upside down. Also to prevent it from being rotated thereon. To secure this result the projections E with the concave portion between them, are placed on both sides of the casting B so that it may be reversed when needed, the advantages of which will be explained later on.

The projections F, which are also placed on both sides of the casting B, are simply projecting points which are used to hold the central parts of the U bolts more closely together than they would otherwise stand, and to prevent them from sliding apart on the casting, thus economizing space on the casting for the connection of other parts, and permitting it to be made shorter than it would have to be if the central portions of the U bolts were not thus drawn together. In addition to this, the outer ends of the U bolts will be spread farther apart and the ends of the clips D through which the bolts pass may be made straighter and more in line with the contacting sides of the nuts $b$ than they would otherwise be.

The bowl G, which is preferably of cast metal, has on its upper inner edge an outwardly projecting horizontally disposed tubular socket H which is adapted to be slipped on to the adjacent end of the valve casting B forming a water delivery nozzle and to be secured thereon in operative position. On the upper and lower sides of the casting B portions of the walls are extended out to form what may be called retaining ribs I. The upper and lower adjacent portions of the socket H are also extended out, forming the recessed portions J to fit over the ribs I, which will prevent the socket, and the bowl G, of which it is a part, from being laterally rotated on the casting B. The bowl is held in place on the casting by means of a set screw K which is inserted in an enlarged threaded portion H' on the upper side of the socket H. When the socket H is slipped on the end of the casting B and the set screw K is fastened therein the bowl will be held securely in place but may be easily removed by loosening the set screw.

The casting B is called the valve casting, because it is provided with a valve seat L which is preferably an inwardly extended portion of the casting upon which a valve M operates, and it is also preferably located in a central part of the casting. The valve is provided with a stem N which passes out of the end of the casting B to which the bowl G is connected and it is preferably fitted with a burr O on its outer end. On the upper portion of the socket H where it is joined to the upper edge of the bowl G are a pair of upstanding lugs P upon which a so-called nose piece Q is pivoted at its upper end by means of a pivot pin or bolt R. The other end of the valve casting is fitted with a water supply pipe S, which admits water into the portion of the casting behind the valve M. When the animal wants a drink it presses its nose down upon the lower end of the part Q, which being in contact, a short distance below the pivot pin R, with the end of the stem N, or the burr O thereon, the stem will be pushed back and the valve opened and water admitted through the casting B into the bowl.

On the rear end of the stem N behind the valve M is a coiled spring T, one end of which rests against the valve M and the other end against a screw plug U in the end of the casting B. When the animal removes its nose from the part Q the tension of the spring will push back and close the valve M and the water will be prevented from flowing into the bowl until the nose piece Q is again pressed down. The end of the casting B adjacent the bowl is preferably made semi-spherical with a small close fitting hole in the center of the end for the stem N to pass through, and a larger opening X to admit water into the bowl. It is also preferable that the wall of the bowl socket below the opening to admit water into the bowl be lowered and made sloping so as to form an open space V, as shown in Figs. 1 and 5, whereby the water will be more freely conducted into the bowl. The lower rear portion of the socket H being drawn up tightly against the lower side of the casting B by the set screw K no leakage will be permitted at this point if the bowl should become full, and if desired, a small piece of a thin rubber gasket may be inserted which will make it absolutely water tight.

As already stated, the casting B is preferably made reversible so it may be turned upside down. To do this all that is necessary is to disconnect the water supply pipe S, then loosen the set screw K and take off the water bowl. Then remove the nuts $b$ from the U bolts C to loosen them, when the casting may be turned over and placed upside down with the recess between the projections E on the opposite side of the casting resting against the stall post A. Some of the advantages of this construction are as follows: As shown in Fig. 1, the water supply pipe S comes into the valve casting on the upper side, but if it is desired to have it come in on the lower side, all that is necessary is to turn the valve casting upside down, as described. Also, if it would be advantageous to have it come in at either side instead of above or below, all that will be needed will be to make an opening in one side of the casting B, as shown in Fig. 1 in which the supply pipe may be inserted on either side by turning the casting upside down. This opening is closed with a screw plug W when not in use, as shown in Fig. 6. When the casting is made reversible it will be necessary to duplicate the opening X in the end of the casting B to admit water into the bowl. The water will always pass into the bowl through the opening in the lower side, and if it should be admitted into the casting in large quantities, the portion of the socket wall immediately above the upper opening will practically prevent it from passing through this opening.

The plug U in the rear end of the casting B is removed for smoothing the valve seat L, and also, for inserting the valve stem N and coiled spring T. The valve M is preferably interiorly threaded and securely fastened to the stem N, and is therefore inserted along with the stem. The use of the burr O is to prevent the end of the stem from wearing a hole in the contacting portion of the nose piece Q and also to lessen wear on the end of the stem. It is preferably interiorly threaded, and is placed on the stem after it has been inserted in the casting B. The inner end of the plug U is preferably made hollow so as to receive and hold in place the rear end of the valve stem N which is preferably made smaller than its other end.

It will be readily seen that the bowl will be securely held on the casting B by means of the set screw K, much more so than by any manual attachment, and also that the two U bolts will hold the casting very firmly on the stall post A. Furthermore, that before tightening the U bolts C the casting may be turned around on the post so as to set the bowl in any desired position. The construction is extremely simple and efficient in operation.

What I claim as new and desire to secure by Letters Patent is—

1. In water bowls for animal stalls, the combination of a tubular valve casting adapted to be connected in a horizontal position to a vertically disposed stall post, and a water bowl having a socket adapted to be slipped on the adjacent end of the valve casting, and to be fastened thereon; said valve casting having ribs on its upper and lower sides adapted to enter corresponding recesses in said socket, to prevent rotation of the socket on the casting, and also tipping of the bowl, of which the socket is a part.

2. In water bowls for animal stalls, the combination of a tubular valve casting adapted to be connected in a horizontal position to a vertically disposed stall post, a water bowl having a socket adapted to be slipped on the adjacent end of the valve casting, said casting having ribs on its upper and lower sides adapted to enter corresponding recesses in said socket, and a set screw in the bowl socket adapted to impinge on the wall of the valve casting and to hold the socket in position thereon.

3. In water bowls for animal stalls, the combination with a stall post, of a tubular valve casting having valve mechanism therein, and a laterally extended concave face on a central portion of its outer side, said concave face being adapted to fit the contour of the adjacent side of the stall post, when at substantially right angles thereto, a pair of U bolts encircling the opposite side of the casting, and then having their ends passed by the sides of the post, clips on the opposite side of the post having openings in their ends through which the ends of the U bolts are passed, means to connect the ends of the U bolts to the clips, and a water bowl connected to one end of the valve casting, whereby the casting and the bowl will be securely connected to the stall post, and water may be admitted into the bowl by means of the valve mechanism in the casting.

4. In a device of the character described a tubular valve casting adapted to be connected in a substantially horizontal position to a vertically disposed stall post by means of a pair of U bolts, as described, a water bowl being carried on one end of the valve casting and a water supply pipe on the other end, and there being a pair of concaved portions on the side of the valve casting embraced by the central portions of the U bolts, said concave portions being set closer together than the normal position of the bolts on the stall post, and holding the central portions of the U bolts closer together, whereby the adjacent portions of the water bowl and the supply pipe may be set closer together and the valve casting be made that much shorter.

5. In a device of the character described, a tubular valve casting adapted to be connected in a substantially horizontal position to a vertically disposed stall post by means of a pair of U bolts, as described, a laterally extended concave face on opposite sides of the casting, either of which is adapted to fit the adjacent side of the stall post, and while permitting the casting to be reversed or turned upside down, preventing it from being rotated thereon, a water bowl secured to one end of the valve casting and adapted to receive water through valve mechanism in the casting, the other end of said casting being fitted with openings for water supply pipes on adjacent sides at substantially right angles to each other, whereby said water supply pipe may be brought into the valve casting from either side or from above or below by reversing the casting or in other words turning it upside down.

6. In a device of the character described, a tubular valve casting adapted to be connected in a substantially horizontal position to a vertically disposed stall post, means for admitting water into one end of the casting, valve mechanism to control the passage of the water through the casting, a water bowl having a socket to fit over the other end of the casting and connect the bowl thereto, an opening in that end of the casting to admit water into the bowl, and a recessed portion in the socket below said opening to more freely conduct the water into the bowl.

7. In a device of the character described, a tubular valve casting adapted to be reversibly connected in a substantially horizontal position to a vertically disposed stall post, means for admitting water into one end of the casting, valve mechanism to control the passage of the water through the casting, a water bowl having a socket to fit over the other end of the casting and connect the bowl thereto, duplicate openings in that end of the casting one above the other, the upper opening being covered over with a portion of the wall of the socket to prevent any flow of the water therethrough and a recess in the socket underneath the lower opening to more freely conduct the water through said lower opening into the bowl.

WILLIAM LOUDEN.